United States Patent [19]

Pinson

[11] Patent Number: 4,974,793
[45] Date of Patent: Dec. 4, 1990

[54] TAPERED CHAMBER DISPENSING OF OPTICAL FIBER
[75] Inventor: George T. Pinson, Huntsville, Ala.
[73] Assignee: The Boeing Company, Seattle, Wash.
[21] Appl. No.: 451,184
[22] Filed: Dec. 15, 1989
[51] Int. Cl.⁵ .............................................. F41G 7/32
[52] U.S. Cl. .................................................. 244/312
[58] Field of Search ........................................ 244/3.12
[56] References Cited

U.S. PATENT DOCUMENTS

| | | | |
|---|---|---|---|
| 3,156,185 | 11/1964 | Hermann et al. | 102/374 |
| 3,319,781 | 5/1967 | Simpson et al. | 206/389 |
| 3,613,619 | 10/1971 | DeNobel et al. | 114/21.1 |
| 4,326,657 | 4/1982 | Arpin et al. | 226/97 |
| 4,624,185 | 11/1986 | Emerson | 102/293 |
| 4,770,370 | 9/1988 | Pinson | 244/3.12 |
| 4,796,833 | 1/1989 | Pinson | 244/3.12 |
| 4,860,968 | 8/1989 | Pinson | 244/3.12 |

Primary Examiner—Charles T. Jordan
Assistant Examiner—Rochelle Lieberman
Attorney, Agent, or Firm—Finnegan, Henderson, Farabow, Garrett & Dunner

[57] ABSTRACT

A projectile controlled by way of an optical fiber includes a body having an airframe; an outlet in the projectile body adapted for allowing the optical fiber to be pulled out of the body; a bobbin for holding the optical fiber, the bobbin being tapered so that a helix formed by the optical fiber will not scrape over the bobbin; and a tapered chamber within the projectile body, the chamber having a first end connected to the outlet and a second end having the bobbin located therein. The diameter of the chamber is smaller than the diameter of the helix formed by the optical fiber at the exit plane of the bobbin measured without the constraining chamber, and the tapered chamber has a polished and lubricated inner surface. Additionally, the chamber may have a tube extension joined by springs for extending the chamber past the outlet.

19 Claims, 5 Drawing Sheets

FIG. 7
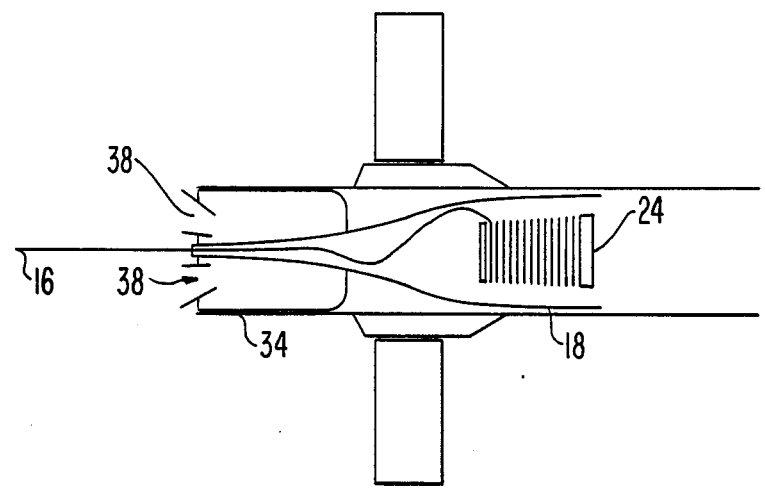
FIG. 8(a)
FIG. 8(b)
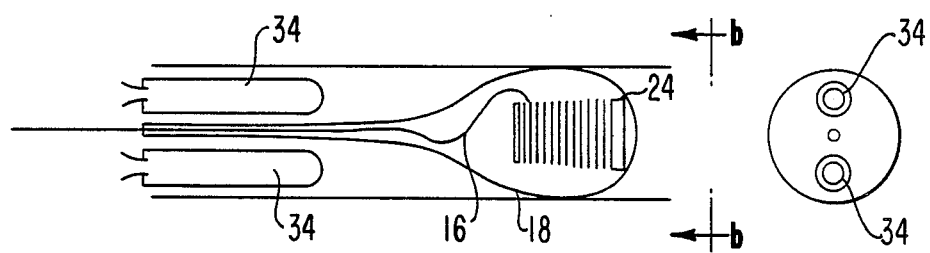

TAPERED CHAMBER DISPENSING OF OPTICAL FIBER

BACKGROUND OF THE INVENTION

1. FIELD OF THE INVENTION

The invention relates to a fiber-optically controlled projectile containing a system for dispensing optical fiber from a bobbin.

2. DESCRIPTION OF RELATED ART

In most current weapon systems that rely upon an optical fiber to provide a two-way data link between a user and the projectile, the fiber is released directly into the slip-stream of a projectile.

An exception to this method of releasing a fiber directly into the slip-stream is described in U.S. Pat. Nos. 4,796,833 and 4,770,370, both to Pinson. In these references the bobbin is placed within an airframe behind an obturator, thereby requiring that the fiber pass from the bobbin located within the airframe and be guided by a smooth, tapered section prior to exit from the projectile.

Another exception to the method of releasing the fiber directly into the slip-stream around the missile is to release it into an artificially generated gas-stream within a chamber. This gas-stream then carries the fiber to an outlet. This method is disclosed in U.S. Pat. No. 4,326,657 to Arpin et al.

Use of these two alternatives to releasing the fiber directly into the slip-stream either requires the optical fiber to be released adjacent to the rear of the projectile, or requires an active gas-stream generation within the projectile.

A simple passive system allowing the optical fiber dispensing bobbin to be placed at various locations inside a projectile is desirable.

SUMMARY OF THE INVENTION

The advantages of the invention will be set forth in part in the description which follows, and in part will be obvious from the description, or may be learned by practice of the invention. The advantages of the invention will be realized and attained by means of the elements and combinations particularly pointed out in the appended claims.

In accordance with the purpose of the invention, as embodied and broadly described herein, a projectile controlled by way of an optical fiber comprises: a projectile body having an aft end; an outlet in the projectile body adapted for allowing the optical fiber to be pulled out of the body; a bobbin having a tapered outer surface for holding the optical fiber; and a tapered chamber within the projectile body, the chamber having a smaller diameter first end connected to the outlet and a larger diameter second end having the bobbin located therein, the bobbin being oriented with the bobbin taper in the direction of the chamber taper; whereby the optical fiber may be pulled from the bobbin, pass through the chamber and exit the projectile body.

In a preferred embodiment of the present invention, the chamber has a polished and lubricated surface, and the bobbin is tapered at a angle greater than the angle of pull on the fiber. Also, the diameter of the chamber at the bobbin exit plane is less than that for an unconstrained helix formed by an optical fiber pulled from the bobbin.

It is to be understood that both the foregoing general description and the following detailed description are exemplary and explanatory only and are not restrictive of the invention as claimed.

The accompanying drawings, which are incorporated in and constitute a part of this specification, illustrate several embodiments of the aspects and features of the invention, and together with the description, serve to explain the principles of the invention.

BRIEF DESCRIPTION OF THE DRAWINGS

FIG. 7 is a partial cross-section of a projectile according to a second embodiment of the invention.

FIGS. 8a and 8b are a partial cross-section of a projectile according to a third embodiment of the invention.

DESCRIPTION OF THE PREFERRED EMBODIMENT

Reference will now be made to the presently preferred embodiments and implementations of the invention, as illustrated in the accompanying drawings. Whenever possible, the same reference numbers will be used throughout the drawings to refer to the same or like parts.

Figure 1:
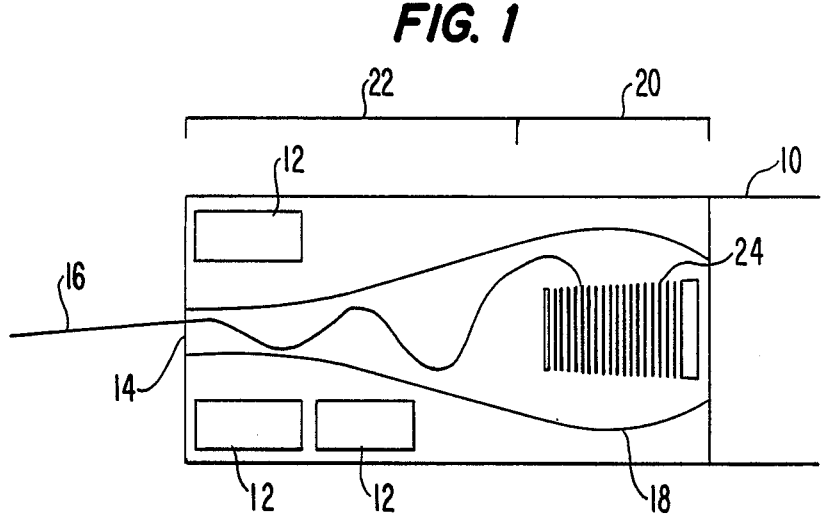
FIG. 1 is a partial cross-section of a projectile according to the invention.

In accordance with the invention, a projectile controlled by an optical fiber comprises a projectile body having an aft end. As embodied herein and depicted in partial cross-section in FIG. 1, projectile body 10 provides an airframe structure which contains miscellaneous projectile components 12 (e.g., guidance system, warhead, motors, etc.). Examples of various projectile bodies for various types of projectile systems are well known in the art; as an example, a mortar projectile is shown in U.S. Pat. No. 4,770,370 to Pinson.

In accordance with the invention, a projectile controlled by way of an optical fiber comprises an outlet in the projectile body adapted for allowing the optical fiber to be pulled out of the body. As embodied herein and depicted in FIG. 1, outlet 14 releases the optical fiber 16 into the slip-stream. Outlet 14 is located generally toward the rear and preferably in the aft end of the projectile body. The optical fiber is connected at one end to a projectile controller (not shown) which serves to provide for control of the projectile throughout its flight. As the projectile travels down range, fiber 16 is pulled from the projectile body and through the outlet. Various alternative placements of the outlet are contemplated by this invention. Specific placement depends on convenience and the location of various potentially interfering other missile components. Specific embodiments of this invention will be discussed below.

In accordance with the invention, a projectile controlled by way of an optical fiber further comprises a bobbin having a tapered outer surface for holding the optical fiber. A embodied herein, shown in FIG. 1, bobbin 24 is mounted within the projectile body 10. The bobbin is wound with an optical fiber by methods known in the art. For example, applicant's copending application Ser. No. 07/032,243, filed Mar. 31, 1987, discloses one method of winding an optical fiber on a bobbin.

Figure 2:
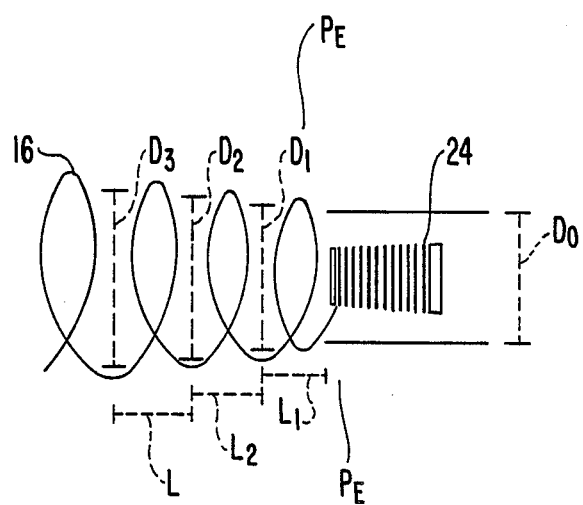
FIG. 2 is a conceptual depiction of an optical fiber being released directly into the slip-stream.

As background information, FIG. 2 shows the natural tendency for a fiber 16 departing an unconstrained bobbin 24 to form a helix as it enters the slip-stream. The forces acting to strip the fiber from the bobbin are a combination of linear forces pulling the fiber parallel to the bobbin centerline and lateral forces induced by the restraint of the fiber by adhesive and the winding method.

Since the fiber is wound on a cylindrical surface, these forces result in the fiber leaving the bobbin in a helical manner. For light adhesion between the fiber layers on the bobbin, and rapid linear velocity, the unconstrained helix almost immediately increases to the projectile body diameter which is generally equal to the release orfice diameter. Initially, forces may cause the helix to expand as in $D_0 < D_1 < D_2 < D_3$; however, this expansion causes the distance (L) between the helical loops to lengthen such that $L_1 < L_2 < L_3$. Rapidly, the fiber begins to form a nearly linear path as the helical distance ($L_i$) is elongated. The actual shape of the unconstrained helix formed is a function of the design and the release environment. For slow (V<100 ft/sec) and fast (V>300 ft/sec) dispensing speeds, the helix diameter may not increase at all.

The bobbin in this invention is tapered because it is desirable for the diameter of the helix as the fiber is stripped from the bobbin to be larger than the bobbin diameter at the exit plane ($P_E$). Unless this occurs, the fiber removed from a portion of the bobbin forward of the exit plane will strike the bobbin at the exit plane, thereby causing potential damage to the fiber. The shape of the bobbin should therefore be adapted such that the unconstrained helix diameter is greater than the bobbin diameter at the exit plane at conditions of fiber deployment (i.e., projectile velocity and fiber pull angle).

Figure 3A:
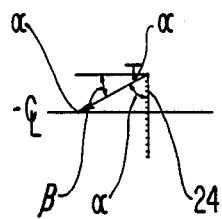
FIGS. 3a, 3b and 3c are a conceptual depiction of an optical fiber being released in accordance with the invention.
Figure 3B:
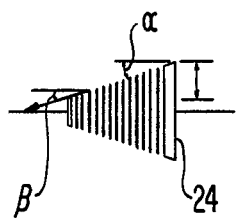
Figure 3C:
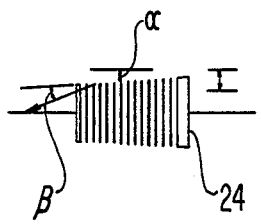

FIG. 3 shows various possible configurations for the bobbin. For a 90° bobbin angle $\alpha$ as shown in FIG. 3(a), there is no potential for interference between the fiber being pulled from the bobbin and succeeding rows of the fiber on the bobbin for a pull either parallel to the centerline or toward at an angle $\beta$ toward a fixed point (d) along the bobbin centerline. If, as in FIG. 3(b), the angle of pull $\beta$ is equal to the bobbin angle $\alpha$, the fiber will rub across the rows, and if, as in FIG. 3(c), the angle of pull $\beta$ is greater than the bobbin angle $\alpha$, then the fiber pulls and scrapes across the bobbin and the probability of fiber breakage is greatly enhanced. Therefore, the design of the bobbin is preferably such that $\alpha \geq \beta$.

The importance of the proper bobbin angle increases with the increasing speed of the projectile. When the condition $\alpha \geq \beta$ occurs, the fiber will be removed from the bobbin in a stable helical mode exhibiting a standing wave effect with the helix diameter greater than the diameter of the small end of the bobbin.

In accordance with the invention, a projectile controlled by way of an optical fiber comprises a tapered chamber within the projectile body. As embodied herein and depicted in FIG. 1, tapered chamber 18 has a wide forward portion 20 and a narrower tapering rearward portion 22 which connects to outlet 14. Optical fiber is dispensed from a bobbin 24 located at the forward end of the chamber. Dimensions and finish of the chamber preferably do not allow the fiber to pile up or to break due to excess friction caused by the movement of the fiber.

In the present invention, the tapered chamber is preferably shaped to cause linear dispensing of the fiber, because the formation of the helix creates some disadvantage since it increases the length of fiber required per unit travel of the projectile. Also, the fiber removal rate per unit velocity is increased.

Figure 4:
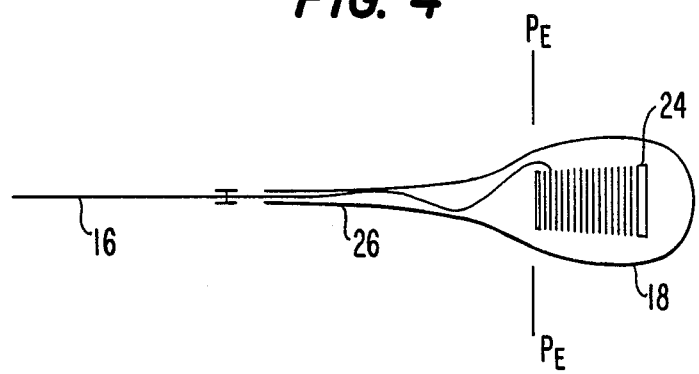
FIG. 4 is a conceptual depiction of an optical fiber being released from a bobbin.

As shown in FIG. 4, the chamber 18 is tapered such that at exit plane ($P_E$) of the fiber from the bobbin 24, the chamber diameter is smaller than the diameter of the helix that would form naturally, that is from a unconstrained bobbin. The further taper of the chamber serves to further damp the helix, and the fiber can be released from the projectile in a linear manner. After the fiber passes the end of the bobbin the diameter of the chamber can be reduced 5 or more diameters without affecting the stripping process. The greater the reduction of the diameter, the more linear the pay-out.

The smaller diameter portion of the tapered chamber 18 near the outlet serves to guide the optical fiber. This portion is preferably contoured and smoothly faired from the dimension of the main portion of the chamber to the dimension of the outlet 14. The smaller diameter portion of the chamber may eventually reach a point of constant diameter, and may either terminate at the outlet or continue for a predetermined distance into the slip-stream. The chamber 18 near the outlet is preferably straight, but may be bent, as shown in the specific embodiments discussed below.

Figure 5:
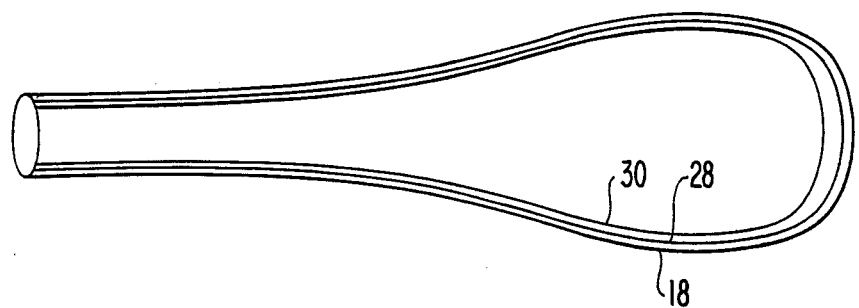
FIG. 5 depicts the polished and lubricated surfaces according to the invention.

The constraining factor on the length, shape and straightness of the chamber is the frictional forces exerted by the walls of the chamber upon the optical fiber. The forces must be kept below the tensile strength of the fiber (i.e., the point at which the fiber will break). Therefore, as shown in FIG. 5, chamber 18 preferably has a highly polished surface 28 selected such that the coefficient of friction between the fiber and the surface is at a minimum consistent with good engineering practice. To further reduce the friction, a dry lubricant coating 30 may be placed on the polished surfaces of the chamber. Teflon impregnated $AL_2O_3$ is one example of a suitable lubricant. Other lubricants are suitable provided that they are chemically compatible to the buffer or outside coating on the optical fiber and can be retained on the surface for the duration of the pay-out.

In many projectile applications (for example, shoulder fired missiles) it is necessary for a booster or ejector motor to propel the projectile to an initial speed after which the projectile either coasts or is propelled by a sustainer engine. The release of the optical fiber into the propulsion gasses of the motor simplifies the packaging design. The subject invention may be used in many different embodiments to accomplish this result, some of those embodiments are described below.

Figure 6:
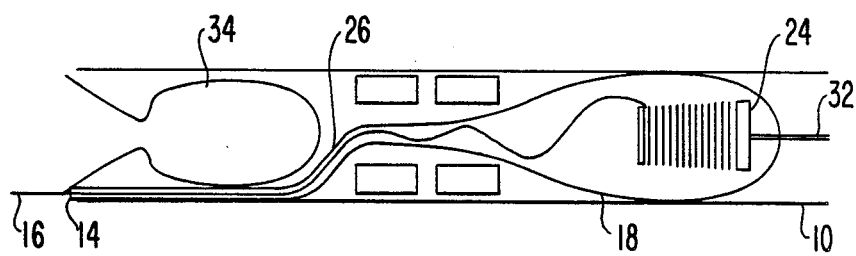
FIG. 6 is a partial cross-section of a projectile according to a first embodiment of the invention.

In a first embodiment shown in FIG. 6, a bobbin 24 is placed within tapered chamber 18 and attached to the projectile body 10 by a support 32. The chamber is connected to an outlet 14 beside motor 34 by a bent portion 26 of chamber 18 which is bent to guide the fiber 16 to the outlet. The portion of chamber 18 adjacent to the motor is insulated.

In a second embodiment shown in FIG. 7, the chamber 18 is routed through the motor 34. In this design the portion of chamber 18 within the solid rocket motor is insulated, and a nozzle 38 is provided for the rocket exhaust.

In a third embodiment shown in FIG. 8, multiple separate motors 34 are used, and the chamber 18 exits between the motors. In this embodiment, the chamber 18 need not be straight but may be bent to cause the fiber to exit at an outlet not along the projectile centerline so long as the induced friction on the fiber is less than its tensile strength.

In each of the three embodiments discussed above, the portion of the fiber being released into the gas plume during the period of time that the motor is burning is preferably insulated. However, if the projectile speed is sufficiently great ($\geq 500$ ft/sec) insulation may not be required. Additionally, the temperature of the exhaust plume cools so that insulation 8-10 plume diameters behind the projectile is no longer required. Suitable coatings to protect the fiber are disclosed in applicant's copending application Ser. No. 07/229,502, filed Aug. 8, 1988.

Figure 9:
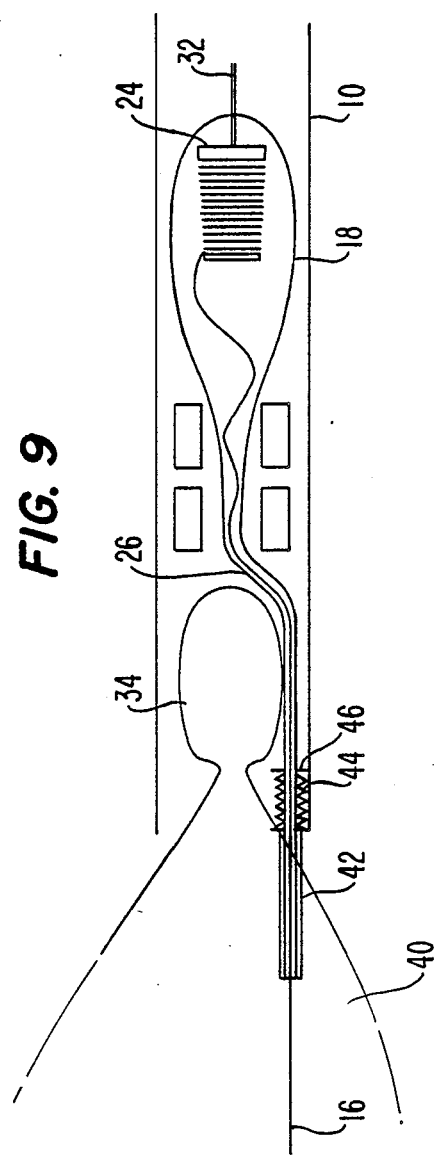
FIG. 9 is a partial cross-section of a projectile having an insulated tube extension.

Furthermore, in each of the embodiments, the routing of the fiber into the rocket motor exhaust plume 40 can be modified by extending the chamber with an insulated tube extension 42, as shown by example in FIG. 9. Insulated tube extension 42 serves to guide the fiber into or out of the exhaust plume at an extended distance from the nozzle outlet. Preferably, the insulated tube extension comprises means for flexibly joining the chamber and the tube extension. As embodied herein, means for flexibly joining includes springs 44 which act against spring reaction surface 46. Springs 44, are released during launch to extend tube 42 from its undeployed to deployed position.

It will be apparent to those skilled in the art that various modifications and variations could be made to the invention without departing from the scope or spirit of the invention.

Other embodiments of this invention will be apparent to those skilled in the art from consideration of the specification and practice of the invention disclosed herein. It is intended that the specification and examples be considered as exemplary only, with the true scope and spirit being indicated by the following claims.

What is claimed is:

1. A projectile controlled by way of an optical fiber, the projectile comprising:
   a projectile body having an aft end;
   an outlet in said projectile body adapted for allowing the optical fiber to be pulled out of said body;
   a bobbin holding said optical fiber; and
   a tapered chamber within said projectile body, said chamber having a smaller diameter first end connected to said outlet and a larger diameter second end having said bobbin located therein;
   whereby said optical fiber may be pulled from the bobbin, pass through said chamber and exit said projectile body.

2. The projectile, as recited in claim 1, wherein said chamber has a polished inner surface.

3. The projectile, as recited in claim 2, wherein said polished inner surface is lubricated.

4. The projectile, as recited in claim 1, wherein said outlet is centered in said aft end of said projectile, and wherein said chamber is aligned with said outlet.

5. The projectile, as recited in claim 4, further including a rocket nozzle wherein said outlet is within said rocket nozzle.

6. The projectile, as recited in claim 5, wherein said tapered chamber near said outlet is insulated.

7. The projectile, as recited in claim 4, further including multiple rocket motors surrounding said outlet.

8. The projectile, as recited in claim 1, wherein said outlet is not centered in said aft end of said projectile body, and wherein said chamber is bent to connect to said outlet.

9. The projectile, as recited in claim 1, wherein optical fiber leaving said bobbin at an exit plane would tend to form an unconstrained helix if not constrained by said chamber, and wherein the diameter of said tapered chamber at said exit plane is less than the diameter of said unconstrained helix at said exit plane.

10. The projectile, as recited in claim 1, wherein said tapered bobbin is smoothly tapered at an angle greater than the angle at which said optical fiber is pulled from said bobbin.

11. The projectile, as recited in claim 1, further comprising a tube extension joined to said smaller diameter first end of said chamber, said tube extension extending past said outlet.

12. The projectile, as recited in claim 11, further comprising means for flexibility joining said tube extension and said chamber.

13. The projectile, as recited in claim 11, wherein said tube extension is insulated.

14. An optical fiber dispensing apparatus comprising:
   a bobbin holding said optical fiber; and
   a tapered chamber having a smaller diameter first end and a larger diameter second end having said bobbin located therein, wherein optical fiber leaving said bobbin at an exit plane would tend to form an unconstrained helix if not constrained by said chamber, and wherein the diameter of said tapered chamber at said exit plane is less than the diameter of said unconstrained helix at said exit plane;
   whereby said optical fiber may be pulled from the bobbin and pass through said chamber.

15. The apparatus, as recited in claim 14, wherein said chamber has a polished inner surface.

16. The apparatus, as recited in claim 15, wherein said polished inner surface is lubricated.

17. The apparatus, as recited in claim 14, wherein said tapered bobbin is tapered at a first angle relative to the axis of said bobbin and said optical fiber is pulled from said bobbin at a second angle relative to the axis of said bobbin, and wherein said first angle is greater than said second angle.

18. The projectile, as recited in claim 1, wherein said bobbin has a tapered outer surface and said bobbin is oriented with the bobbin taper in the direction of the chamber taper.

19. The apparatus, as recited in claim 14, wherein said bobbin has a tapered outer surface and said bobbin is oriented with the bobbin taper in the direction of the chamber taper.

* * * * *

UNITED STATES PATENT AND TRADEMARK OFFICE
CERTIFICATE OF CORRECTION

PATENT NO. : 4,974,793

DATED : December 4, 1990

INVENTOR(S) : GEORGE T. PINSON

It is certified that error appears in the above-identified patent and that said Letters Patent is hereby corrected as shown below:

Column 6, line 30, change "flexibility" to --flexibly--.

Column 6, line 46, change "14" to --19--.

Column 6, line 50, change "14" to --19--.

Signed and Sealed this

Third Day of March, 1992

Attest:

HARRY F. MANBECK, JR.

Attesting Officer     Commissioner of Patents and Trademarks